Figures 1, 2, 3:
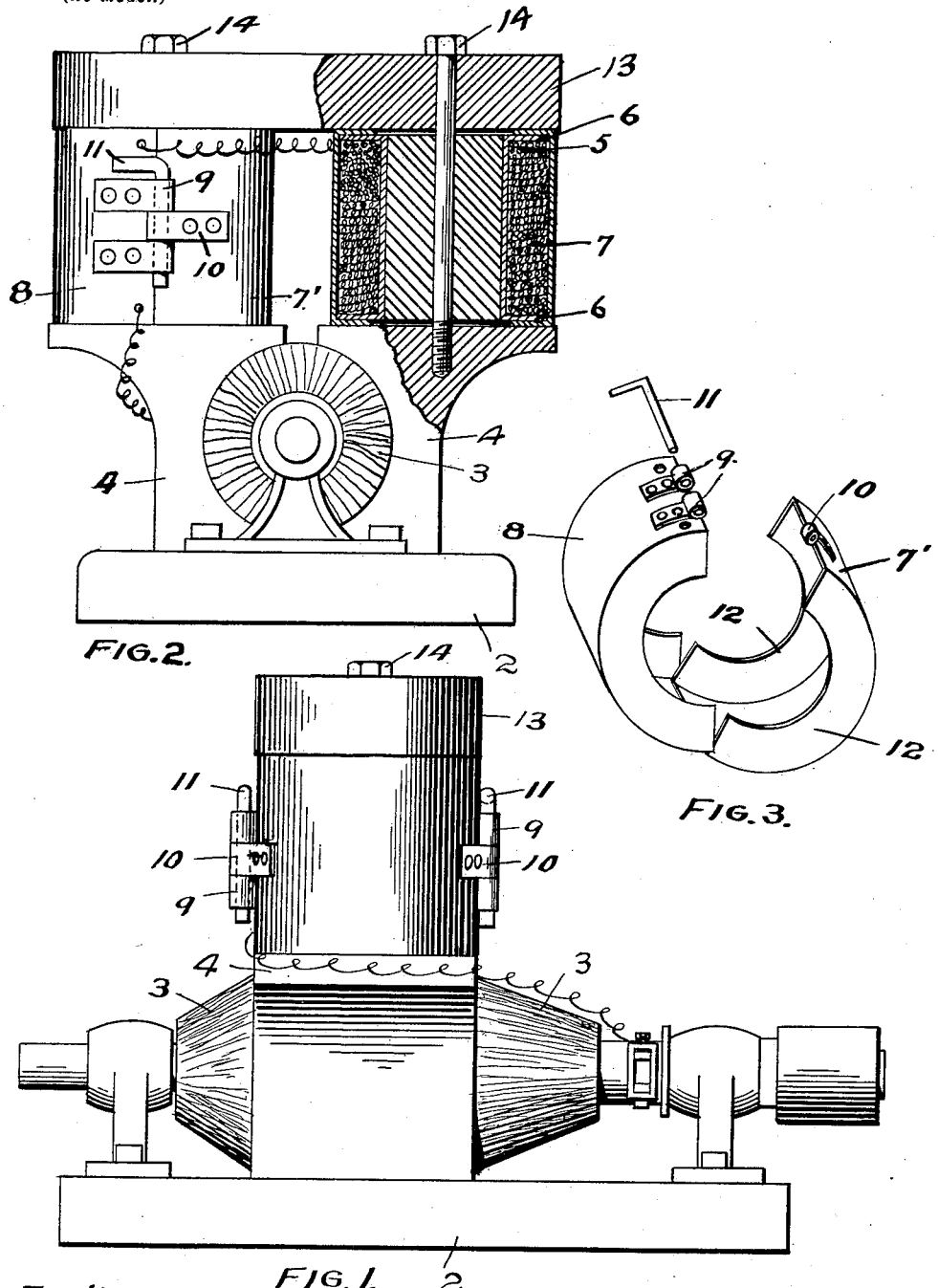

No. 626,922. Patented June 13, 1899.
J. H. NAGLE.
DUST OR WATER PROOF CASING FOR FIELDS OF ELECTRIC MOTORS.
(Application filed Apr. 6, 1899.)
(No Model.)

Witnesses,
Inventor,
James H. Nagle.
His attorneys.

UNITED STATES PATENT OFFICE.

WILLOUGHBY STATHAM SMITH, OF LONDON, ENGLAND.

ELECTRIC CABLE.

SPECIFICATION forming part of Letters Patent No. 626,940, dated June 13, 1899.

Application filed November 7, 1898. Serial No. 695,699. (No model.)

*To all whom it may concern:*

Be it known that I, WILLOUGHBY STATHAM SMITH, electrical engineer, a subject of the Queen of Great Britain, residing at 13 Courtfield road, South Kensington, London, in the county of Middlesex, England, have invented certain new and useful Improvements in Electric Cables, of which the following is a specification.

This invention has for its object improvements in conductors for electric cables, more particularly submarine cables, whereby the inductive capacity of such cables is considerably reduced. In order to obtain the lowest inductive capacity, the surface area of the conductor should be as small as possible in proportion to its sectional area, and were it not for the danger of any single wire breaking it would be best to use a solid conductor of cylindrical form. In practice a strand of seven or more wires of equal diameter or a central wire surrounded with any number of wires of a smaller diameter is used; but by these methods the surface area is considerably increased.

In the accompanying drawings, Figure 1 is a side elevation of a section of one form of an electric cable embodying my improvements. Fig. 2 shows another form of my invention, and Fig. 3 a third modification.

In each figure of the drawings, $a$ indicates a central cylindrical wire, and $b$ indicates a metal tape wound spirally around it.

In Fig. 2, $x$ indicates a tape wound helically around the spiral tape $b$ and parallel with it.

In Fig. 3, $a$ indicates a central cylindrical wire, and $b$ a metallic tape wound helically around the wire $a$. $c$ indicates a second tape wound helically upon the tape $b$, but in an opposite direction to the winding of the tape $b$. $d$ indicates a third metallic tape wound helically upon the tape $c$ and in an opposite direction to the winding of the tape $c$. It will thus be seen that according to my invention a thin metallic tape is wound helically around a central cylindrical wire and that two or more such tapes can be laid around the wire parallel to one another, or two or more layers of such tape can be superimposed with or without reversed lays of any desired thickness.

It is essential that the tape or tapes should be of the same metal as the cylindrical conductor, and practically copper is the only suitable metal, for silver is too expensive.

A cable thus constructed approaches a solid in regard to surface area, while the danger of failure of continuity is avoided.

Whenever necessary, such as for submarine cables, the cylindrical wire is first coated with an adhesive compound before receiving the metal tape, or if layers of tapes are superimposed it is advisable to use compound between each layer, but the various layers must not be insulated from each other.

It will be observed that I use a single solid cylindrical wire, about which a tape of the same metal is wound helically. By far the greater portion of the conductor is in a solid cylindrical form, only sufficient ribbon being used to bridge over any defect in the central conductor.

United States patent to Bishop, No. 588,382, of August 17, 1897, shows a conductor consisting of a number of small round wires twisted together, over which a tape of metal is wound; but my conductor differs essentially from that shown in the Bishop patent.

What I claim is—

1. The combination of a single solid metallic conductor, and tapes of the same metal as the conductor helically wound on it, and in electrical connection with it, the diameter of the central conductor being largely in excess of the thickness of the tape, or their combined thickness, when two or more layers are used.

2. The combination of a single, solid, cylindrical, metallic conductor of comparatively large area, in cross-section, and a relatively thin tape of the same metal as the conductor, helically wound on it and in close contact and electrical connection with it, the area in cross-section of the central or solid conductor in the tape-covered conductor being in excess of the area in cross-section of the tape portion thereof.

3. The combination of a single, cylindrical, metallic conductor and tapes of the same metal as the conductor, helically wound on it and in electrical connection with it, the area in cross-section of the central conductor being in excess of the area in cross-section of the tape covering thereof.

WILLOUGHBY STATHAM SMITH.

Witnesses:
WILFRED CARPWAEL,
WALTER J. SKERTEN.